United States Patent
Durham et al.

(10) Patent No.: US 10,108,557 B2
(45) Date of Patent: Oct. 23, 2018

(54) TECHNOLOGIES FOR MEMORY CONFIDENTIALITY, INTEGRITY, AND REPLAY PROTECTION

(71) Applicant: Intel Corporation, Santa Clara, CA (US)

(72) Inventors: David M. Durham, Beaverton, OR (US); Siddhartha Chhabra, Hillsboro, OR (US); Men Long, Beaverton, OR (US); Eugene M. Kishinevsky, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 14/750,664

(22) Filed: Jun. 25, 2015

(65) Prior Publication Data
US 2016/0378687 A1    Dec. 29, 2016

(51) Int. Cl.
| G06F 11/30 | (2006.01) |
| G06F 12/14 | (2006.01) |
| G06F 12/0864 | (2016.01) |
| H04L 9/32 | (2006.01) |

(52) U.S. Cl.
CPC ...... *G06F 12/1408* (2013.01); *G06F 12/0864* (2013.01); *H04L 9/3242* (2013.01); *G06F 2212/1052* (2013.01); *G06F 2212/402* (2013.01); *G06F 2212/60* (2013.01); *H04L 9/3247* (2013.01)

(58) Field of Classification Search
CPC . H04L 2209/12; H04L 9/3242; H04L 9/3247; G06F 21/125; G06F 21/72; G06F 12/1408
See application file for complete search history.

(56) References Cited

U.S. PATENT DOCUMENTS

| 5,615,263 | A  * | 3/1997 | Takahashi | G06F 9/30189 711/E12.1 |
| 6,523,118 | B1 * | 2/2003 | Buer | G06F 21/85 380/28 |
| 7,043,616 | B1 * | 5/2006 | McGrath | G06F 9/30101 711/163 |
| 9,300,464 | B1 * | 3/2016 | Roth | H04L 9/0891 |
| 2004/0181303 | A1 * | 9/2004 | Walmsley | B41J 2/04505 700/115 |

(Continued)

OTHER PUBLICATIONS

"Advanced Encryption Standard", downloaded from http://en.wikipedia.org/wiki/Advanced_Encryption_Standard, retrieved Mar. 4, 2015.

*Primary Examiner* — Jeffery Williams
*Assistant Examiner* — James Forman
(74) *Attorney, Agent, or Firm* — Barnes & Thornburg LLP

(57) ABSTRACT

Technologies for memory encryption include a computing device to generate a keyed hash of a data line based on a statistical counter value and a memory address to which to write the data line and to store the keyed hash to a cache line. The statistical counter value has a reference probability of incrementing at each write operation. The cache line includes a plurality of keyed hashes and each of the keyed hashes corresponds with a different data line. The computing device further encrypts the data line based on the keyed hash, the memory address, and the statistical counter value.

31 Claims, 7 Drawing Sheets

(56) References Cited

U.S. PATENT DOCUMENTS

| | | | |
|---|---|---|---|
| 2005/0105738 A1* | 5/2005 | Hashimoto | G06F 21/72 380/277 |
| 2008/0282093 A1* | 11/2008 | Hatakeyama | G06F 12/1416 713/190 |
| 2010/0161904 A1* | 6/2010 | Cypher | G06F 12/0811 711/122 |
| 2011/0145501 A1* | 6/2011 | Steely, Jr. | G06F 12/0806 711/121 |
| 2011/0293097 A1* | 12/2011 | Maino | G06F 12/0811 380/279 |
| 2013/0217332 A1* | 8/2013 | Altman | H04H 60/90 455/41.2 |
| 2014/0040632 A1* | 2/2014 | Chhabra | G06F 21/64 713/189 |
| 2014/0223197 A1* | 8/2014 | Gueron | G06F 21/72 713/193 |
| 2016/0070643 A1* | 3/2016 | Shen | G11C 11/5628 711/103 |
| 2017/0104584 A1* | 4/2017 | Shrimpton | H04L 9/0625 |

* cited by examiner

TECHNOLOGIES FOR MEMORY CONFIDENTIALITY, INTEGRITY, AND REPLAY PROTECTION

BACKGROUND

Today's memory interfaces are often exposed to adversaries who have physical access to the computing device including the associated memory. For example, if external storage and/or memory are utilized, an adversary with physical access to that computing device can potentially remove those components and scan them for data (e.g., passwords and/or other confidential data). Further, more advanced adversaries could, for example, place a logic analyzer on a bus or insert FPGA-based memory that attempts to modify program behavior of a computing device to, for example, undermine the security of a program (e.g., by changing memory, corrupting memory, and/or replaying memory that was legitimate at some time in the past). In a distributed environment, the storage and memory could be located far away from the computing device utilizing it, thereby potentially increasing the security risk.

Counter mode encryption (e.g., AES-CTR) typically involves encrypting a counter value (e.g., based on a secret key) and combining the resulting pad with the plaintext such as data desired to be protected (e.g., via an exclusive or (XOR) operation). As such, the counter rather than the data is encrypted. Although counter mode encryption permits parallel and/or advanced computing because the pads may be computed in advance of receipt of the data to be encrypted, counter mode encryption generally requires the counter values to be also stored in memory as metadata. As such, subsequently fetching the counter values from memory results in additional memory lookups, thereby adding to the memory bandwidth and storage overhead and reducing performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
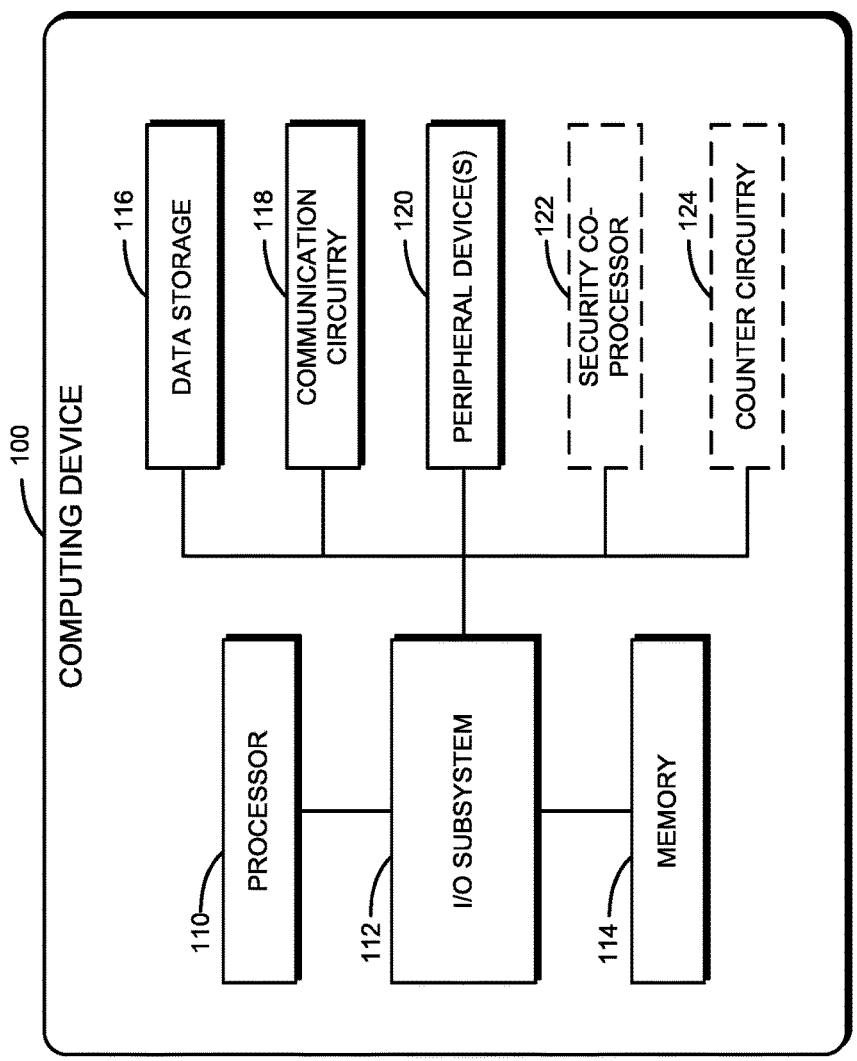
FIG. 1 is a simplified block diagram of at least one embodiment of a computing device for memory confidentiality, integrity, and replay protection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for memory confidentiality, integrity, and replay protection is shown. As described in detail below, the computing device 100 is configured to implement a technique for efficiently maintaining the confidentiality and integrity of contents of memory (via encryption and hashing) and protecting the contents from various attacks (e.g., replay attacks). For example, the illustrative computing device 100 merges an integrity value (e.g., a keyed hash message authentication code (HMAC)) with a counter value for use with counter mode cryptography, thereby reducing the memory storage overhead and bandwidth associated with storing separate counters in traditional counter mode operation. In particular, in some embodiments, the computing device 100 appends or otherwise combines a statistical counter value and a keyed hash (e.g., MAC) value for a particular data line (e.g., along with the memory address, global counter state and/or version tree data, initialization vector, and/or other suitable data) and encrypts the resulting data using counter mode cryptography. As described below, in the illustrative embodiment, the statistical counter is a counter that increments with some probability (e.g., a reference probability) each time a cache line (e.g., data line) in memory is modified and, therefore, permits counter values to be utilized while avoiding the need to maintain counter values in memory and additional state data in the processor of the computing device 100. Further, the encrypted counter data, which may be referred to herein for simplicity as a "cryptographic pad" may be used as the key for a reduced round encryption/decryption of the data line (e.g., 2 or 2½ rounds of symmetric cryptographic algorithm operations, such as Advanced Encryption Algorithm (AES) operations). It should be appreciated that, in various embodiments, any cryptographic algorithm for symmetric-key cryptography may be utilized with any number of rounds provided that the property that an adversary must have two or more known plaintexts to break the key using differential analysis is maintained. As described herein, in some embodiments, the computing device 100 may form a portion of a distributed computing environment in which case the computing device 100 may communicate with other computing devices over one or more networks.

The computing device 100 may be embodied as any type of computing device capable of performing the functions described herein. For example, the computing device 100 may be embodied as a desktop computer, laptop computer, tablet computer, notebook, netbook, Ultrabook™, smartphone, cellular phone, wearable computing device, personal digital assistant, mobile Internet device, smart device, server, router, switch, Hybrid device, and/or any other computing/communication device. As shown in FIG. 1, the illustrative computing device 100 includes a processor 110, an input/output ("I/O") subsystem 112, a memory 114, a data storage 116, a communication circuitry 118, and one or more peripheral devices 120. Additionally, in some embodiments, the computing device 100 may include a security co-processor 122 and/or a counter circuitry 124. Of course, the computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 100 as described herein. It should be appreciated that, in some embodiments, the computing device 100 may also utilize one or more network storage/memory devices (e.g., remote DRAM over a fabric or network connection).

The communication circuitry 118 may be embodied as any communication circuit, device, or collection thereof, capable of enabling communications between the computing device 100 and other remote devices over a network. For example, in some embodiments, the computing device 100 may utilize memory and/or data storage located on a remote computing device (e.g., in a cloud computing environment). The communication circuitry 118 may be configured to use any one or more communication technologies (e.g., wireless or wired communications) and associated protocols (e.g., Ethernet, Bluetooth®, WiFi®, WiMAX, LTE, 5G, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 100.

The security co-processor 122 may be embodied as any hardware component(s) or circuitry capable of establishing a trusted execution environment and performing the functions described herein. For example, in some embodiments, the security co-processor 122 may be embodied as or otherwise utilize a Memory Encryption Engine (MEE), a Trusted Platform Module (TPM), a manageability engine (ME), an out-of-band processor, and/or an Intel® Software Guard Extensions (SGX) secure enclave. In some embodiments, the security co-processor 122 may include one or more modules of the computing device 100 described herein (see, for example, FIG. 2). Further, in some embodiments, the security co-processor 122 may maintain a version tree (e.g., an MEE version tree) in secure memory, which may be utilized to prevent replay attacks. In some embodiments, a core of the processor 110 may provide protections (e.g., via SGX) such that a memory encryption engine forms a portion of the main memory 114 system (not the I/O subsystem 112). In such embodiments, it should be appreciated that the processor 110 may perform the functions of the security co-processor 112 described herein.

The counter circuitry 124 may be embodied as any hardware component(s) or circuitry capable of establishing a statistical counter and otherwise performing the functions described herein. As described below, statistical counter values may be utilized to occasionally "rekey" the keyed hashes (e.g., the counter MACs) and to re-encrypt the corresponding data lines in order to reduce the window within which hash collisions may occur. It should be appreciated that the statistical counter may increment with a reference probability each time a cache line in memory is modified (e.g., by a "write" operation) based on the counter circuitry 124. In other words, the counter circuitry 124 may perform a function analogous to flipping an unfair coin and determining whether to increment the statistical counter or not based on the result. More specifically, in some embodiments, the counter circuitry 124 may utilize a random number generator to generate a random number (e.g., within the range of 0-999) and determine whether the random number matches a predefined value (e.g., 1) within the range. If so, the statistical counter is incremented. It should be appreciated that the range may be adjusted to change the probability that the statistical counter increments (e.g., approximately $\frac{1}{1000}$ in the embodiment described above). Of course, in other embodiments, the counter circuitry 124 may otherwise utilize a random number generator and/or utilize another stochastic process or technique to perform the functions described herein.

In the illustrative embodiment, the statistical counter may increment on average approximately once every thousand write operations. That is, in such embodiments, the probability of incrementing at a given write operation is one one-thousandth. Accordingly, in the illustrative embodiment, it is unnecessary for the computing device 100 to track a counter state via metadata. It should be appreciated that the particular probability distribution (e.g., the mean, standard deviation, etc.) may be based on and/or determined according to the particular counter circuitry 124. In embodiments in which the computing device 100 does not include the counter circuitry 124, the statistical counter may be established and/or generated based on firmware and/or software. In such embodiments, it should be appreciated that the counter circuitry 124 may nonetheless be based on hardware and/or one or more features/characteristics of the hardware.

Figure 2:
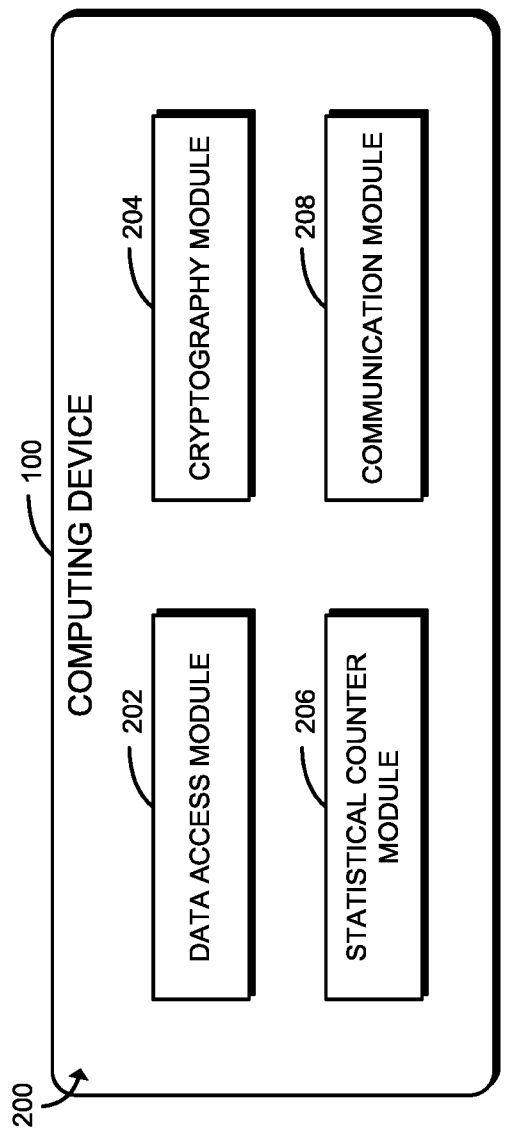
FIG. 2 is a simplified block diagram of at least one embodiment of an environment of the computing device of FIG. 1.

Referring now to FIG. 2, in use, the computing device 100 establishes an environment 200 for memory confidentiality, integrity, and replay protection. The illustrative environment 200 of the computing device 100 includes a data access module 202, a cryptography module 204, a statistical counter module 206, and a communication module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 100. As such, in some embodiments, one or more of the modules of the environment 200 may be embodied as a circuit or collection of electrical devices (e.g., a data access circuit, a cryptography circuit, a statistical counter circuit, and/or a communication circuit). Additionally, in some embodiments, one or more of the illustrative modules may form a portion of another module.

Figure 5:
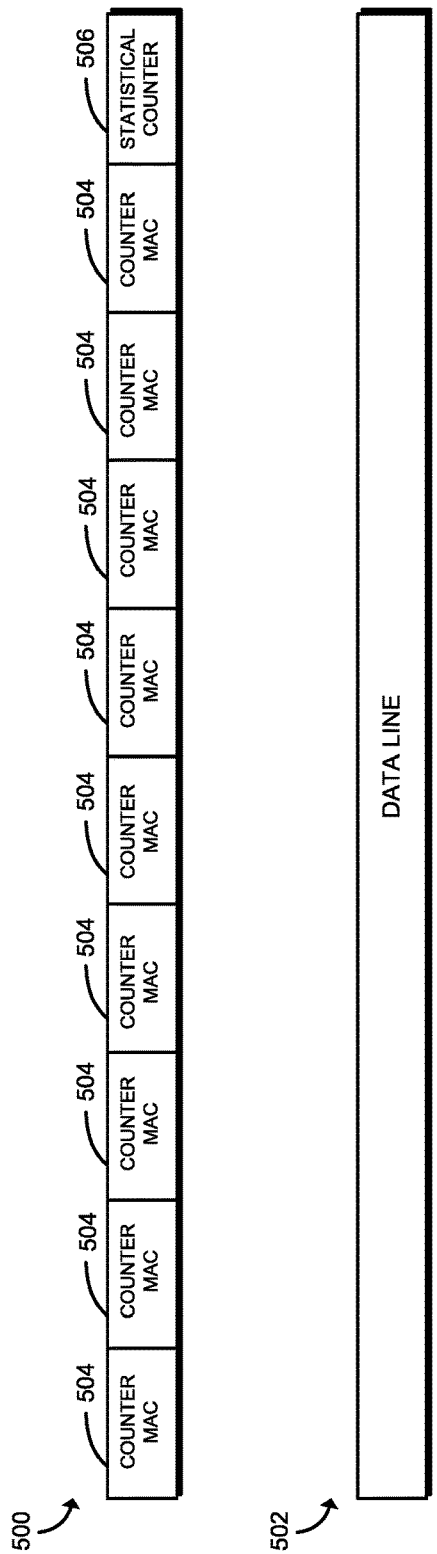
FIG. 5 is a simplified block diagram of at least one embodiment of memory data structures.

The data access module 202 is configured to retrieve and/or store data to the memory 114, the data storage 116, and/or cache lines (e.g., data lines and/or counter MAC lines) of the computing device 100 (see, for example, the cache lines of FIG. 5). For example, as described herein, the data access module 202 may receive/retrieve a data line, and a keyed hash (e.g., HMAC) may be generated based on the particular data line. The data access module 202 may store the keyed hash to a location of a cache line corresponding with that particular data line. Additionally, the data access module 202 may subsequently retrieve an encrypted data line, a statistical counter value, a corresponding keyed hash, and/or other relevant data from the cache lines, the memory 114, and/or the data storage 116.

The cryptography module 204 performs various cryptographic functions for the computing device 100. In some embodiments, the cryptography module 204 may be embodied as a cryptographic engine, an independent security co-processor of the computing device 100 (e.g., security co-processor 124), a cryptographic accelerator incorporated into the processor 110, or a standalone software/firmware. For example, the cryptography module 204 may encrypt/decrypt data (e.g., data lines, etc.) based on a cryptography key, a keyed hash of the data, the memory address associated with the data (e.g., a memory block read/write address), a statistical counter value, version information, an initialization vector, a secret cryptographic key (e.g., a global key), and/or other suitable parameters as described herein. The cryptography module 204 is also configured to generate hashes (e.g., keyed hashes) using one or more suitable algorithms, functions, or mechanisms. For example, in the illustrative embodiment, the cryptography module 204 generates keyed hashes (e.g., HMACs) of the data lines to be utilized in confirming the integrity of the data lines. It should be appreciated that the key of the keyed hash may vary depending on the particular embodiment and may include or incorporate, for example, data associated with a secret cryptographic key, a statistical counter value, version data, a memory address (e.g., the memory block address associated with the read/write of the corresponding data), and/or other suitable information. As described below, the cryptography module 204 may utilize Advanced Encryption Standard (AES) encryption and/or another suitable symmetric cryptographic algorithm (e.g., DES, SERPENT, 3FISH, SIMON, SPECK, etc.). In particular, AES 128 may be utilized in which the block address of the encrypted data is 128 bits with a cache line of 512 bits containing four blocks. It should be appreciated that, in some embodiments, the keyed hash may utilize the unique memory address down to the 128 bit block in the data (cache) line. Further, in some embodiments, the keyed hash may be truncated (e.g., to provide more efficient use of memory space and/or to include more keyed hashes on a particular counter MAC line). Of course, the cryptography module 204 may generate and/or utilize cryptographic keys, signatures, certificates, attestation quotes, and/or other cryptographic functions.

The statistical counter module 206 is configured to manage a statistical counter (e.g., by generating statistical counter values). In some embodiments, the statistical counter may act as a global counter. It should be appreciated that, in some embodiments, the counter circuitry 124 may include or execute the statistical counter module 206. As described above, the statistical counter values may be utilized to "rekey" the keyed hashes and to re-encrypt the corresponding data lines. In some embodiments, the statistical counter module 206 updates, for example, the counter MAC line with the new statistical counter values when the statistical counter is incremented. It should be further appreciated that, in some embodiments, the statistical counter module 206 incorporates version data (e.g., hierarchical version tree counters) into the statistical counter value (e.g., by appending various counter/version values to one another). For example, in some embodiments, the statistical counter value may include version data similar to that described in U.S. Patent Application Publication No. 2014/0040632 by Chhabra et al.

The communication module 208 handles the communication between the computing device 100 and remote devices through a network. For example, as indicated above, in some embodiments, the computing device 100 may utilize memory and/or data storage located on a remote computing device (e.g., in a cloud computing environment).

Figure 3:
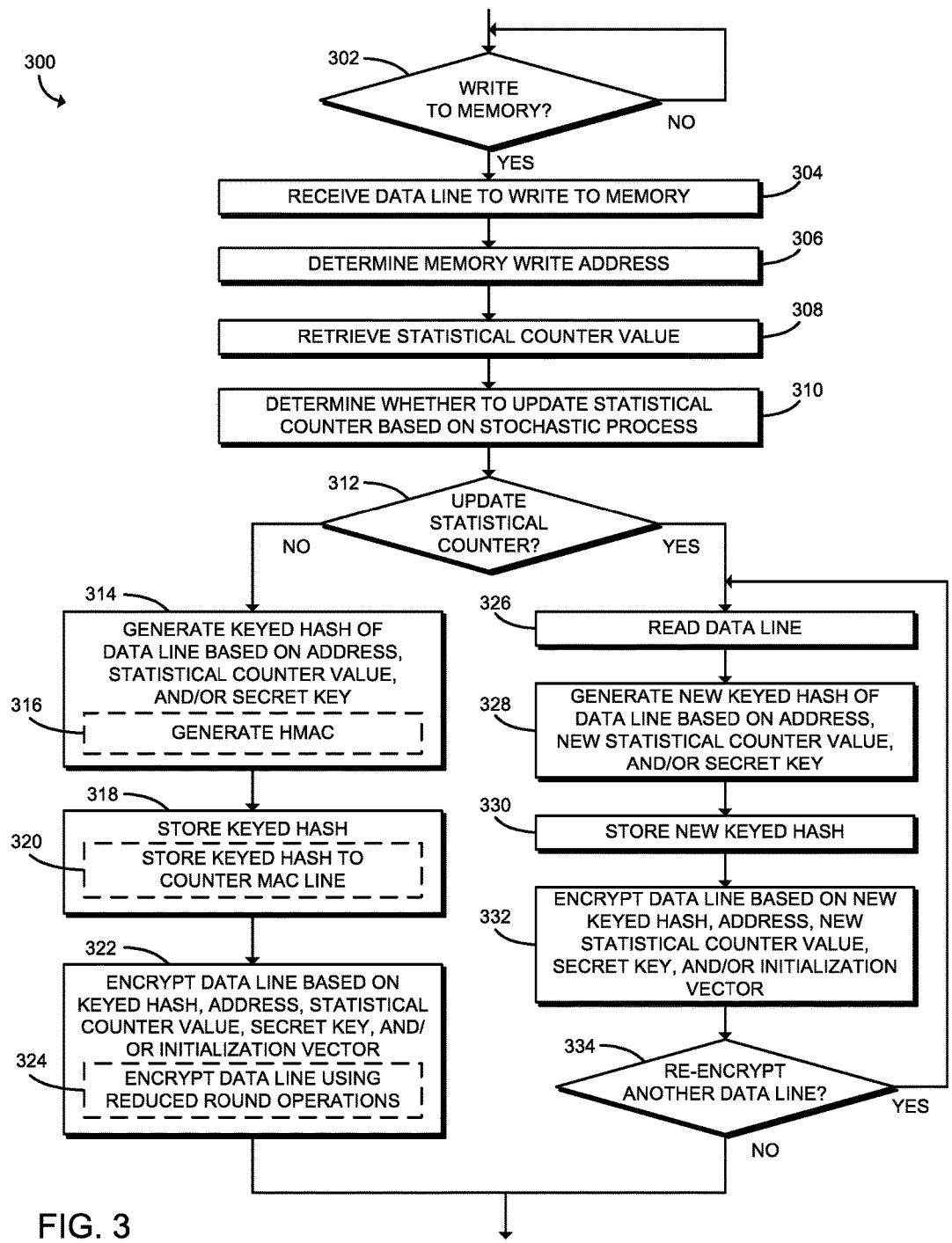
FIG. 3 is a simplified flow diagram of at least one embodiment of a method for memory encryption.

Referring now to FIG. 3, in use, the computing device 100 may execute a method 300 for memory encryption. The illustrative method 300 begins with block 302 in which the computing device 100 determines whether to write to memory. For example, a write-back from the core cache may be executed, which is the eviction of a modified line in the cache to make "room" for incoming data (e.g., a particular data line). If so, the computing device 100 receives the data line to write to the memory 114 in block 304. In block 306, the computing device 100 determines a memory write address indicative of the memory address to which to write the data line. For example, the computing device 100 may determine the particular physical memory address of the memory 114. The computing device 100 retrieves the statistical counter value (e.g., associated with the data line) in block 308. As shown in FIG. 5, in some embodiments, the statistical counter value may be stored in a counter MAC line corresponding with a plurality of counter MACs (e.g., keyed hashes).

In block 310, the computing device 100 determines whether to update the statistical counter value based on the stochastic processed implemented (e.g., by the counter circuitry 124). As described above, in some embodiments, the statistical counter may increment with some probability (e.g., a reference probability) each time a cache line in memory is modified (e.g., by a "write" operation) based on the counter circuitry 124. It should be appreciated that by utilizing the statistical counter to occasionally "rekey" the keyed hashes and re-encrypt the data lines as described below, the computing device 100 may utilize the reduced round cryptographic operations while still maintaining strong security (e.g., due to the limited hash collision window).

If the computing device 100 determines, in block 312, that the statistical counter is not to be updated (e.g., the counter circuitry 124 did not indicate that the statistical counter value should be incremented), the computing device 100 generates a keyed hash of the data line based on the memory address, the statistical counter value, and/or a secret cryptographic key (e.g., a global key) in block 314. It should be appreciated that, in some embodiments, the same global key may be utilized for each of the keyed hashes. In particular, in block 316, the computing device 100 may generate an HMAC based on the memory address, the statistical counter value, and/or the secret cryptographic key. In other embodiments, the computing device 100 may generate a keyed hash based on any other suitable cryptographic hash algorithm. For example, in some embodiments, a secure hash algorithm (e.g., SHA1, SHA2, SHA3, etc.) or message digest algorithm (e.g., MD5) may be used. It should be appreciated that SHA3 may enable a secure hash to be generated without using double hashing. In some embodiments, in generating the keyed hash, the memory address, the statistical counter value, and/or the secret cryptographic key may be used as the key for the keyed hash. For example, data associated with the memory address and the statistical counter value may be appended or otherwise combined with the secret cryptographic key (e.g., global key) to be used as the key. In some embodiments in which SHA3 is used, those components may be appended or otherwise combined with the data line to generate an HMAC in a single pass. As described herein, it should be appreciated that the statistical counter value may also incorporate version data and/or other counter values. It should be further appreciated that utilizing the statistical counter value in the keyed hash reduces the window of an attack based on hash collisions.

In block 318, the computing device 100 stores the generated keyed hash. For example, in block 320, the computing device 100 may store the keyed hash to a counter MAC line (i.e., a cache line). In some embodiments, the counter MAC line may include a plurality of keyed hashes, each of which corresponds with a particular data line, and may include the statistical counter value utilized by each of the keyed hashes (see, for example, FIG. 5).

In block 322, the computing device 100 encrypts the data line based on the generated keyed hash (counter MAC), the memory address (e.g., block address), the statistical counter value, a secret cryptographic key (e.g., global key), and/or an initialization vector. It should be appreciated that the computing device 100 may utilize any suitable symmetric-key cryptographic algorithm (e.g., AES, DES, triple DES, SERPENT, 3FISH, SIMON, SPECK, etc.) and/or mode to encrypt the data line. In doing so, in block 324, the computing device 100 may encrypt the data line using reduced round operations (i.e., a fewer number of rounds of operations than required by the typical algorithm). For example, in some embodiments, the computing device 100 may encrypt the data line using only 2 or 2½ rounds of AES operations rather than the 10 or so rounds that are typical.

Figure 6:
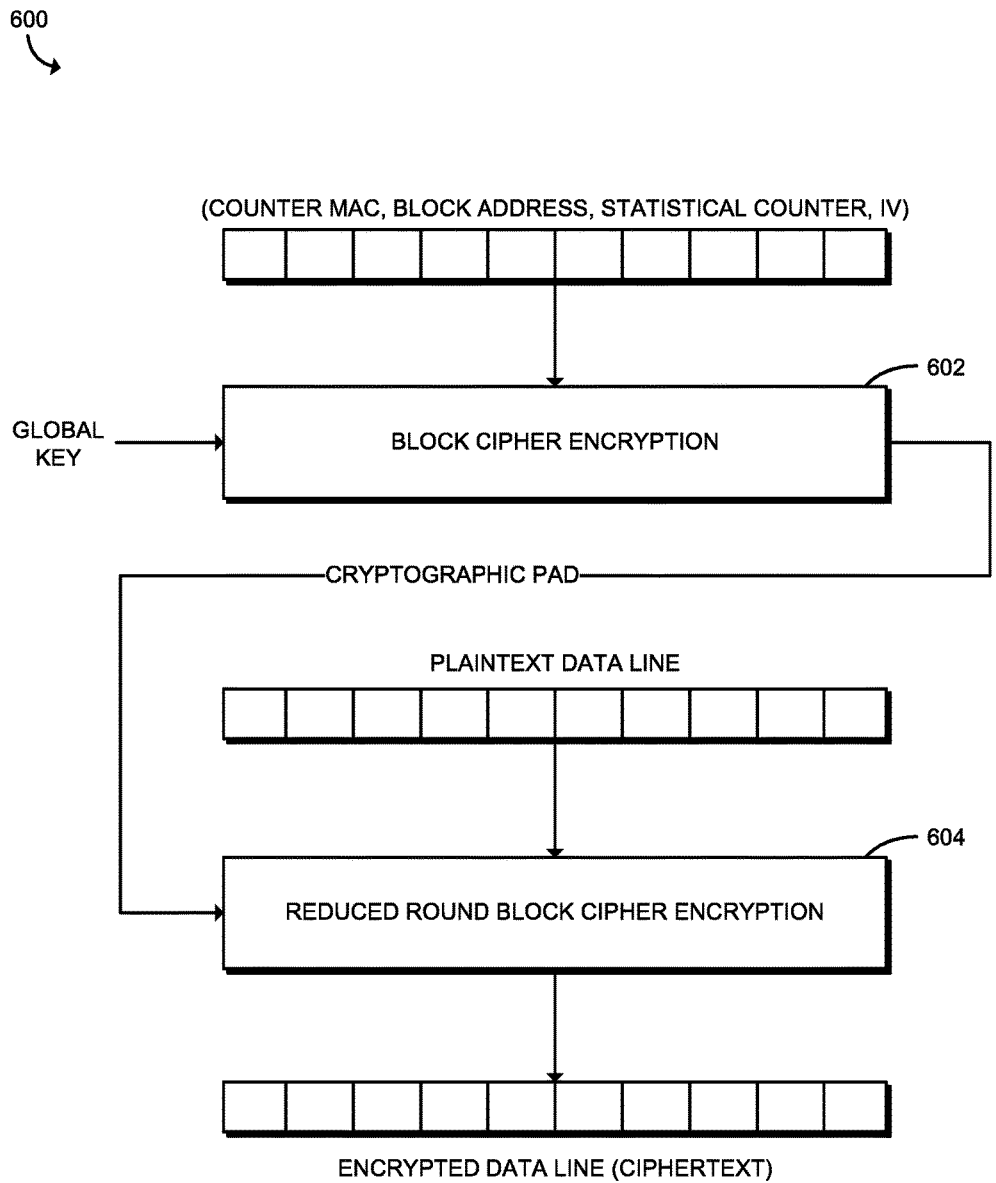
FIG. 6 is a simplified flow diagram of at least one embodiment of a cryptographic mode of encryption.

In the illustrative embodiment, the computing device 100 may encrypt the data line using a cryptographic mode similar to a type of counter mode encryption algorithm in which, among other variations described herein, the counter is replaced with the keyed hash, block memory address, statistical counter value, and/or initialization vector. More specifically, in some embodiments, the computing device 100 may utilize the cryptographic mode 600 of encryption shown in FIG. 6 in order to encrypt the data line. In doing so, the computing device 100 may utilize block cipher encryption based on a suitable symmetric-key cryptographic algorithm to encrypt the keyed hash (counter MAC), block address, statistical counter value, and initialization vector with a global key in block 602. Depending on the particular embodiment, the global key may be the same or different from the secret cryptographic key used in conjunction with the generation of the keyed hash described above. As indicated above, the encryption results in ciphertext, which may be referred to as a "cryptographic pad." In block 604, the computing device 100 employs reduced round block cipher encryption (e.g., 2 or 2½ rounds of encryption) to encrypt the data line in which the cryptographic pad is used as the encryption key. Of course, the encrypted data line may be stored in the memory 114 and/or the data storage 116 for subsequent use. It should be appreciated that in the embodiment of FIG. 6, the data line is shown as one block of the data line and, on a data line write/read, all of the blocks are encrypted/decrypted (e.g., four blocks for AES 128). As such, in such embodiments, all of the blocks of the data line must be decrypted before the keyed hash may be calculated and compared with the corresponding counter MAC as described below.

Unlike traditional counter mode encryption, it should be appreciated that, in the illustrative embodiment, it is unnecessary to store separate counter values as metadata due to, for example, the statistical counter values and/or other counters (e.g., version tree counters) being incorporated in the keyed hash. In other embodiments, the computing device 100 may utilize one or more of the keyed hash, the memory address, the statistical counter, and/or additional data (e.g., a secret cryptography key, version data, etc.) as the "counter" and/or cryptographic key when encrypting the data line.

Referring back to FIG. 3, if the computing device 100 determines, in block 312, to update the statistical counter value (e.g., based on the stochastic process), the computing device 100 regenerates (i.e., "rekeys") each of the keyed hashes associated with the statistical counter based on the new statistical counter value. Accordingly, in some embodiments, the computing device 100 updates the statistical counter value in the counter MAC line and each of the counter MACs based on the updated statistical counter value. Additionally, the computing device 100 re-encrypts each of the data lines corresponding with the updated counter MACs of the counter MAC line based on the new keyed hashes and the new statistical counter value. Although updating all of the keyed hashes and re-encrypting the data lines may be computationally expensive, in the illustrative embodiment, the statistical counter rarely increments (e.g., approximately every thousand write operations). It should be appreciated that the approximate frequency at which the statistical counter increments may be tuned to achieve a desired security.

In particular, in the illustrative embodiment, the computing device 100 reads one of the data lines corresponding with the statistical counter in block 326. To do so, the computing device 100 may read an encrypted data line corresponding with the statistical counter and decrypt the encrypted data line based on the previously stored keyed hash (e.g., the counter MAC generated based on the statistical counter value before update of the statistical counter value) associated with the data line. It should be appreciated that, in some embodiments, the computing device 100 may execute the method 400 of FIG. 4 described below in order to read the data line (i.e., using the previously stored keyed hash and statistical counter value). In block 328, the computing device 100 generates a new keyed hash (e.g., counter MAC) based on the new statistical counter value, the memory address, and/or the secret cryptography key (e.g., a global key). In block 330, the computing device 100 stores the new keyed hash back to memory (e.g., to the same memory address at which the keyed hash was stored prior to "rekeying"). In block 332, the computing device 100 re-encrypts the data line based on the new keyed hash, the new statistical counter value, the memory address, the secret cryptographic key, and/or the initialization vector and stores the re-encrypted data line back to memory (e.g., to the same memory address at which the data line was previously stored). It should be appreciated that, in some embodiments, the blocks 328-332 may be executed by the computing device 100 in a manner similar to the execution of the blocks 314-324 described above (i.e., using the new statistical counter value). In block 334, the computing device 100 determines whether to re-encrypt another data line. For example, in the illustrative embodiment, the computing device 100 determines whether there any other data lines corresponding with the statistical counter to encrypt or re-encrypt based on the new statistical counter value. If so, the method 400 returns to block 326 in which the computing device 100 reads the next data line.

Figure 4:
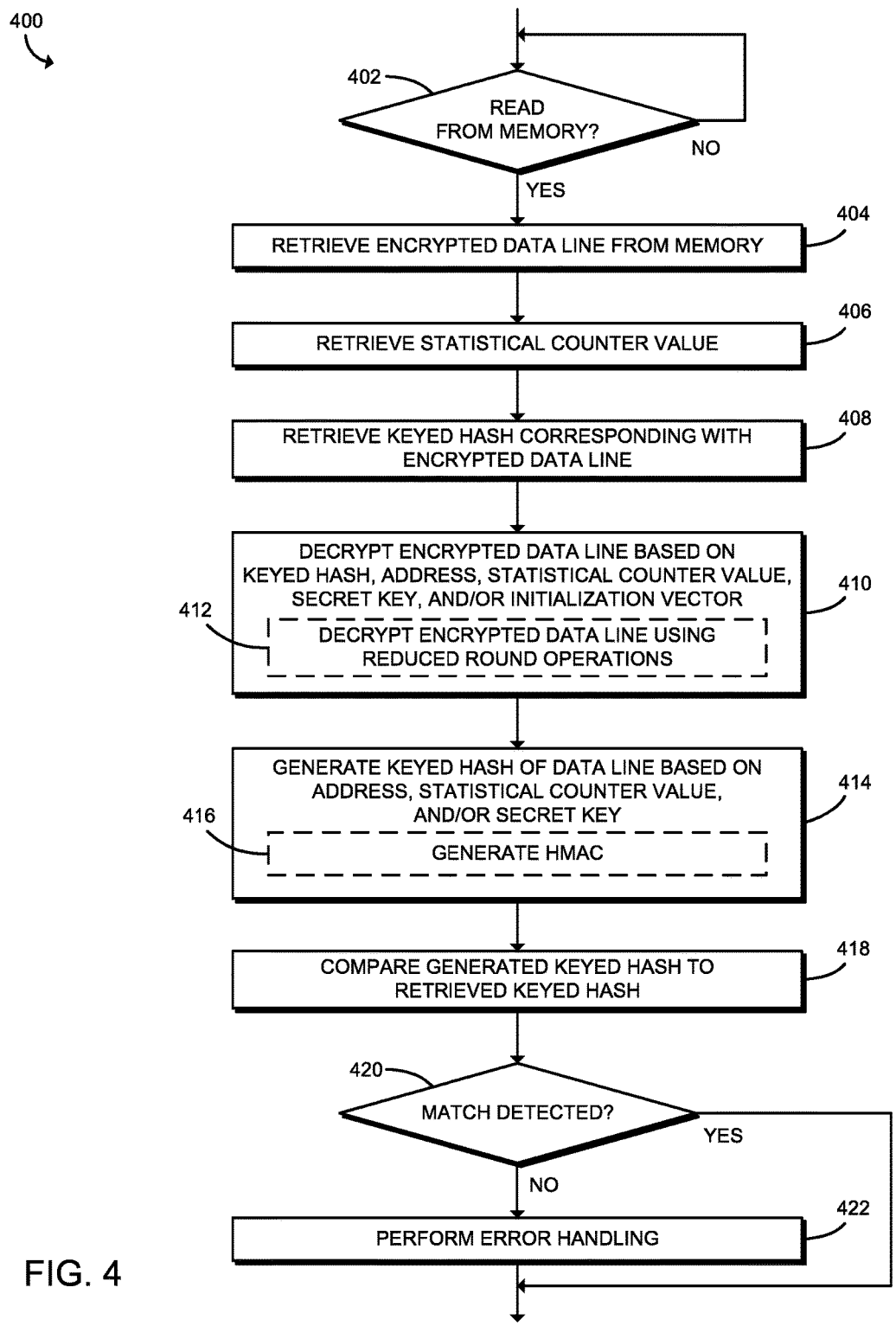
FIG. 4 is a simplified flow diagram of at least one embodiment of a method for memory decryption.

Referring now to FIG. 4, in use, the computing device 100 may execute a method 400 for memory decryption. The illustrative method 400 begins with block 402 in which the computing device 100 determines whether to read memory (i.e., read data from a particular memory address). If so, in block 404, the computing device 100 retrieves the encrypted data line from the memory corresponding with the requested memory address. In block 406, the computing device 100 retrieves the statistical counter value from the counter MAC line corresponding with the data line. In block 408, the computing device 100 retrieves the keyed hash corresponding with the encrypted data line (e.g., from the corresponding counter MAC line).

Figure 7:
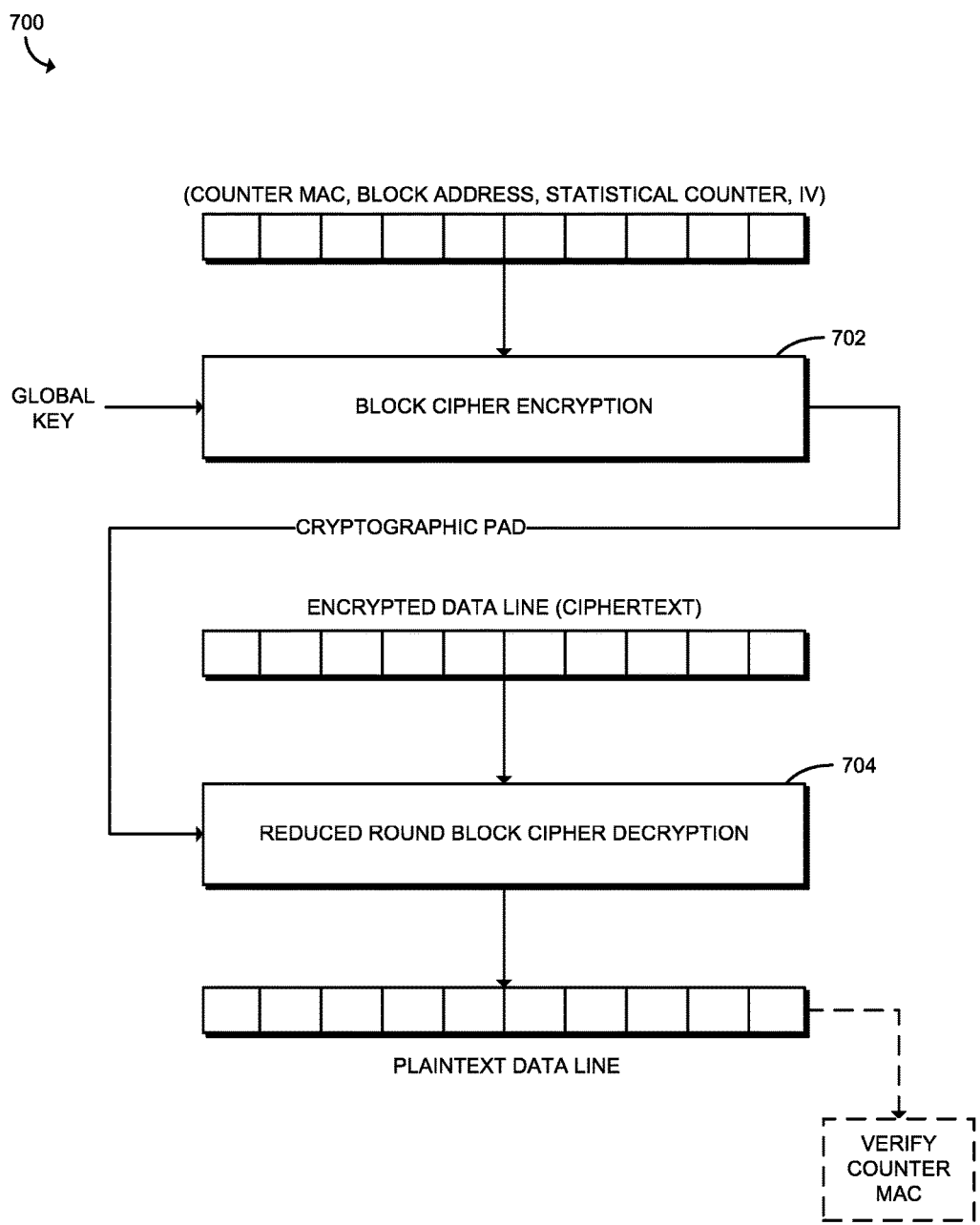
FIG. 7 is a simplified flow diagram of at least one embodiment of a cryptographic mode of decryption.

In block 410, the computing device 100 decrypts the encrypted data line based on the retrieved keyed hash, the memory address to which the read operation is directed (e.g., the physical memory address), the statistical counter value, the corresponding secret cryptographic key (e.g., the global key), and/or an initialization vector. In doing so, in block 412, the computing device 100 may decrypt the encrypted data line using reduced round operations (i.e., a fewer number of rounds of operations than required by the typical cryptographic algorithm). It should be appreciated that the decryption algorithm, mode, and/or technique may correspond with the encryption described above. Further, in the illustrative embodiment, the computing device 100 may decrypt the encrypted data line using the decryption counterpart to the cryptographic mode 600 described above. In particular, in some embodiments, the computing device may utilize the cryptographic mode 700 of decryption shown in FIG. 7 to decrypt the encrypted data line. In doing so, in block 702, the computing device 100 may utilize the block cipher encryption algorithm (i.e., the same algorithm as block 602 of FIG. 6) to encrypt the keyed hash (counter MAC), block address, statistical counter value, and initialization vector with the global key in order to generate the cryptographic pad. In block 704, the computing device 100 employs reduced round block cipher decryption (corresponding with the encryption of block 604 of FIG. 6) using the cryptographic pad as the decryption key to decrypt the encrypted data line. As described herein, the reduced round decryption may consist of, for example, 2 or 2½ rounds of decryption in some embodiments. As described below, the decrypted data line may be used to verify the keyed hash (counter MAC).

Referring back to FIG. 4, in block 414, the computing device 100 generates a keyed hash of the decrypted data line based on the memory address, the statistical counter value, and/or the secret cryptographic key (e.g., the global key). In particular, in block 416, the computing device 100 may generate an HMAC based on the memory address, the statistical counter value, and/or the secret cryptographic key. It should be appreciated that the computing device 100 may generate the keyed hash in a manner similar to that described above with respect to block 312 of FIG. 3. In block 418, the computing device 100 compares the generated keyed hash to the retrieved keyed hash in order to verify the integrity of the data line. It should be appreciated that the two keyed hashes should match if the same data (e.g., data line, memory address, statistical counter value, etc.) are used in generating the hashes. If the computing device 100 determines, in block 420, that the keyed hashes do not match, the computing device 100 performs one or more error handling operations in block 422. It should be appreciated that the particular error handling operations may vary depending on the particular embodiment. For example, in some embodiments, the computing device 100 may alert the user and/or an administrator of the computing device 100. In another embodiment, the computing device 100 may "freeze" one or more components and/or operations of the system.

Referring now to FIG. 5, an illustrative embodiment of memory data structures are shown. In particular, as described above, the computing device 100 may utilize various cache lines (e.g., a counter MAC line 500 and a data line 502) to store and retrieve data. In some embodiments, the counter MAC line 500 includes a plurality of counter MACs 504 (i.e., keyed hashes) and a corresponding statistical counter value 506. Of course, the data line 502 includes the data desired to be read from memory and/or written to memory. In some embodiments, each of the cache lines 500, 502 is configured to hold 512 bits of data. More specifically, the counter MAC line 500 may be configured to hold nine keyed hashes, each of which is 54 bits, and a statistic counter value, which is 26 bits. Accordingly, the techniques described herein permit the use of keyed hashes of a small size while simultaneously maintaining security and efficiency. Of course, it should be appreciated that the computing device 100 may utilize other cache lines and/or data structures in other embodiments. For example, in some embodiments, the computing device 100 may utilize cache lines of different sizes than those described herein. It should be further appreciated that such embodiments may allow fewer or more counter MACs to be stored on a particular cache line. Additionally, in some embodiments, storage devices may allow larger or smaller data accesses (e.g., different storage block sizes). Further, the counter MAC and/or the statistical counter sizes may be selected for an embodiment based on the particular security objectives.

EXAMPLES

Illustrative examples of the technologies disclosed herein are provided below. An embodiment of the technologies may include any one or more, and any combination of, the examples described below.

Example 1 includes a computing device for memory encryption, the computing device comprising a cryptography module to generate a keyed hash of a data line based on a statistical counter value and a memory address to which to write the data line, wherein the statistical counter value has a reference probability of incrementing at each write operation; and a data access module to store the keyed hash to a cache line, wherein the cache line includes a plurality of keyed hashes and each of the keyed hashes corresponds with a different data line; wherein the cryptography module is further to encrypt the data line based on the keyed hash, the memory address, and the statistical counter value.

Example 2 includes the subject matter of Example 1, and wherein to encrypt the data line comprises to encrypt the data line based on a counter mode encryption algorithm.

Example 3 includes the subject matter of any of Examples 1 and 2, and wherein to encrypt the data line comprises to encrypt the data line using fewer than ten rounds of symmetric-key encryption algorithm operations.

Example 4 includes the subject matter of any of Examples 1-3, and wherein to encrypt the data line comprises to encrypt the data line using exactly two rounds of the symmetric-key encryption algorithm operations.

Example 5 includes the subject matter of any of Examples 1-4, and wherein to generate the keyed hash comprises to generate a keyed hash message authentication code (HMAC).

Example 6 includes the subject matter of any of Examples 1-5, and wherein the memory address comprises a physical memory address.

Example 7 includes the subject matter of any of Examples 1-6, and wherein the data access module is further to retrieve the statistical counter value from the cache line.

Example 8 includes the subject matter of any of Examples 1-7, and further including a statistical counter module to generate the statistical counter value.

Example 9 includes the subject matter of any of Examples 1-8, and wherein the cryptography module is further to regenerate the keyed hash based on a new statistical counter value in response to a determination that the statistical counter value has changed.

Example 10 includes the subject matter of any of Examples 1-9, and wherein the cryptography module is further to re-encrypt the data line in response to a determination that the statistical counter value has changed.

Example 11 includes the subject matter of any of Examples 1-10, and wherein the statistical counter value incorporates a version of the data line.

Example 12 includes a method for encrypting memory by a computing device, the method comprising generating, by the computing device, a keyed hash of a data line based on a statistical counter value and a memory address to which to write the data line, wherein the statistical counter value has a reference probability of incrementing at each write operation; storing, by the computing device, the keyed hash to a cache line, wherein the cache line includes a plurality of keyed hashes and each of the keyed hashes corresponds with a different data line; and encrypting, by the computing device, the data line based on the keyed hash, the memory address, and the statistical counter value.

Example 13 includes the subject matter of Example 12, and wherein encrypting the data line comprises encrypting the data line based on a counter mode encryption algorithm.

Example 14 includes the subject matter of any of Examples 12 and 13, and wherein encrypting the data line comprises encrypting the data line using fewer than ten rounds of symmetric-key encryption algorithm operations.

Example 15 includes the subject matter of any of Examples 12-14, and wherein encrypting the data line comprises encrypting the data line using exactly two rounds of the symmetric-key encryption algorithm operations.

Example 16 includes the subject matter of any of Examples 12-15, and wherein generating the keyed hash comprises generating a keyed hash message authentication code (HMAC).

Example 17 includes the subject matter of any of Examples 12-16, and wherein the memory address comprises a physical memory address.

Example 18 includes the subject matter of any of Examples 12-17, and further including retrieving, by the computing device, the statistical counter value from the cache line.

Example 19 includes the subject matter of any of Examples 12-18, and wherein the statistical counter value is generated by a statistical counter.

Example 20 includes the subject matter of any of Examples 12-19, and further including regenerating, by the computing device, the keyed hash based on a new statistical counter value in response to determining the statistical counter value has changed.

Example 21 includes the subject matter of any of Examples 12-20, and further including re-encrypting, by the computing device, the data line in response to determining the statistical counter value has changed.

Example 22 includes the subject matter of any of Examples 12-21 and wherein the statistical counter value incorporates a version of the data line.

Example 23 includes a computing device comprising a processor; and a memory having stored therein a plurality of instructions that when executed by the processor cause the computing device to perform the method of any of Examples 12-22.

Example 24 includes One or more machine readable storage media comprising a plurality of instructions stored thereon that in response to being executed result in a computing device performing the method of any of Examples 12-22.

Example 25 includes a computing device comprising means for performing the method of any of Examples 12-22.

Example 26 includes a computing device for memory encryption, the computing device comprising means for generating a keyed hash of a data line based on a statistical counter value and a memory address to which to write the data line, wherein the statistical counter value has a reference probability of incrementing at each write operation; means for storing the keyed hash to a cache line, wherein the cache line includes a plurality of keyed hashes and each of the keyed hashes corresponds with a different data line; and means for encrypting the data line based on the keyed hash, the memory address, and the statistical counter value.

Example 27 includes the subject matter of Example 26, and wherein the means for encrypting the data line comprises means for encrypting the data line based on a counter mode encryption algorithm.

Example 28 includes the subject matter of any of Examples 26 and 27, and wherein the means for encrypting the data line comprises means for encrypting the data line using fewer than ten rounds of symmetric-key encryption algorithm operations.

Example 29 includes the subject matter of any of Examples 26-28, and wherein the means for encrypting the data line comprises means for encrypting the data line using exactly two rounds of the symmetric-key encryption algorithm operations.

Example 30 includes the subject matter of any of Examples 26-29, and wherein the means for generating the keyed hash comprises means for generating a keyed hash message authentication code (HMAC).

Example 31 includes the subject matter of any of Examples 26-30, and wherein the memory address comprises a physical memory address.

Example 32 includes the subject matter of any of Examples 26-31, and further including means for retrieving the statistical counter value from the cache line.

Example 33 includes the subject matter of any of Examples 26-32, and wherein the statistical counter value is generated by a statistical counter.

Example 34 includes the subject matter of any of Examples 26-33, and further including means for regenerating the keyed hash based on a new statistical counter value in response to determining the statistical counter value has changed.

Example 35 includes the subject matter of any of Examples 26-34, and further including means for re-encrypting the data line in response to determining the statistical counter value has changed.

Example 36 includes the subject matter of any of Examples 26-35, and wherein the statistical counter value incorporates a version of the data line.

Example 37 includes a computing device for memory decryption, the computing device comprising a cryptography module to (i) decrypt an encrypted data line based on a keyed hash, a statistical counter value, and a memory address from which the encrypted data line is accessed, and (ii) generate a keyed hash of the decrypted data line based on the memory address and statistical counter value, wherein the statistical counter value has a reference probability of incrementing at each write operation; and a data access module to retrieve another keyed hash corresponding with the data line from a cache line, wherein the cache line includes a plurality of keyed hashes and each of the keyed hashes corresponds with a different data line; wherein the cryptography module is further to compare the generated keyed hash to the another keyed hash retrieved from the cache line to verify an integrity of the data line.

Example 38 includes the subject matter of Example 37, and wherein to decrypt the encrypted data line comprises to decrypt the encrypted data line based on a counter mode encryption algorithm.

Example 39 includes the subject matter of any of Examples 37 and 38, and wherein to decrypt the encrypted data line comprises to decrypt the encrypted data line using fewer than ten rounds of symmetric-key encryption algorithm operations.

Example 40 includes the subject matter of any of Examples 37-39, and wherein to decrypt the encrypted data line comprises to decrypt the encrypted data line using exactly two rounds of the symmetric-key encryption algorithm operations.

Example 41 includes the subject matter of any of Examples 37-40, and wherein to generate the keyed hash comprises to generate a keyed hash message authentication code (HMAC).

Example 42 includes the subject matter of any of Examples 37-41, and wherein the memory address comprises a physical memory address.

Example 43 includes the subject matter of any of Examples 37-42, and wherein the data access module is further to retrieve the statistical counter value from the cache line.

Example 44 includes the subject matter of any of Examples 37-43, and further including a statistical counter module to generate the statistical counter value.

Example 45 includes the subject matter of any of Examples 37-44, and wherein the cryptography module is further to perform an error handling operation in response to a determination that the generated keyed hash does not match the another keyed hash.

Example 46 includes the subject matter of any of Examples 37-45, and wherein the statistical counter value incorporates a version of the data line.

Example 47 includes a method for decrypting memory by a computing device, the method comprising decrypting, by the computing device, an encrypted data line based on a keyed hash, a statistical counter value, and a memory address from which the encrypted data line is accessed, wherein the statistical counter value has a reference probability of incrementing at each write operation; generating, by the computing device, a keyed hash of the decrypted data line based on the memory address and statistical counter value; and retrieving, by the computing device, another keyed hash corresponding with the data line from a cache line, wherein the cache line includes a plurality of keyed hashes and each of the keyed hashes corresponds with a different data line; and verifying, by the computing device, an integrity of the data line by comparing the generated keyed hash to the another keyed hash retrieved from the cache line.

Example 48 includes the subject matter of Example 47, and wherein decrypting the encrypted data line comprises decrypting the encrypted data line based on a counter mode encryption algorithm.

Example 49 includes the subject matter of any of Examples 47 and 48, and wherein decrypting the encrypted data line comprises decrypting the encrypted data line using fewer than ten rounds of symmetric-key encryption algorithm operations.

Example 50 includes the subject matter of any of Examples 47-49, and wherein decrypting the encrypted data line comprises decrypting the encrypted data line using exactly two rounds of the symmetric-key encryption algorithm operations.

Example 51 includes the subject matter of any of Examples 47-50, and wherein generating the keyed hash comprises generating a keyed hash message authentication code (HMAC).

Example 52 includes the subject matter of any of Examples 47-51, and wherein the memory address comprises a physical memory address.

Example 53 includes the subject matter of any of Examples 47-52, and further including retrieving, by the computing device, the statistical counter value from the cache line.

Example 54 includes the subject matter of any of Examples 47-53, and wherein the statistical counter value is generated by a statistical counter.

Example 55 includes the subject matter of any of Examples 47-54, and further including performing, by the computing device, an error handling operation in response to determining the generated keyed hash does not match the another keyed hash.

Example 56 includes the subject matter of any of Examples 47-55, and wherein the statistical counter value incorporates a version of the data line.

Example 57 includes a computing device comprising a processor; and a memory having stored therein a plurality of instructions that when executed by the processor cause the computing device to perform the method of any of Examples 47-56.

Example 58 includes one or more machine readable storage media comprising a plurality of instructions stored thereon that in response to being executed result in a computing device performing the method of any of Examples 47-56.

Example 59 includes a computing device comprising means for performing the method of any of Examples 47-56.

Example 60 includes a computing device for memory decryption, the computing device comprising means for decrypting an encrypted data line based on a keyed hash, a statistical counter value, and a memory address from which the encrypted data line is accessed, wherein the statistical counter value has a reference probability of incrementing at each write operation; means for generating a keyed hash of the decrypted data line based on the memory address and statistical counter value; and means for retrieving another keyed hash corresponding with the data line from a cache line, wherein the cache line includes a plurality of keyed hashes and each of the keyed hashes corresponds with a different data line; and means for verifying an integrity of the data line by comparing the generated keyed hash to the another keyed hash retrieved from the cache line.

Example 61 includes the subject matter of Example 60, and wherein the means for decrypting the encrypted data line comprises means for decrypting the encrypted data line based on a counter mode encryption algorithm.

Example 62 includes the subject matter of any of Examples 60 and 61, and wherein the means for decrypting the encrypted data line comprises means for decrypting the encrypted data line using fewer than ten rounds of symmetric-key encryption algorithm operations.

Example 63 includes the subject matter of any of Examples 60-62, and wherein the means for decrypting the encrypted data line comprises means for decrypting the encrypted data line using exactly two rounds of the symmetric-key encryption algorithm operations.

Example 64 includes the subject matter of any of Examples 60-63, and wherein the means for generating the keyed hash comprises means for generating a keyed hash message authentication code (HMAC).

Example 65 includes the subject matter of any of Examples 60-64, and wherein the memory address comprises a physical memory address.

Example 66 includes the subject matter of any of Examples 60-65, and further including means for retrieving the statistical counter value from the cache line.

Example 67 includes the subject matter of any of Examples 60-66, and wherein the statistical counter value is generated by a statistical counter.

Example 68 includes the subject matter of any of Examples 60-67, and further including means for performing an error handling operation in response to determining the generated keyed hash does not match the another keyed hash.

Example 69 includes the subject matter of any of Examples 60-68, and wherein the statistical counter value incorporates a version of the data line.

The invention claimed is:

1. A computing device for memory encryption, the computing device comprising:
one or more processors;
one or more memory devices having stored therein a plurality of instructions that, when executed by the one or more processors, cause the computing device to:
determine, at each cache write operation in the one or more memory devices, that a reference probability is satisfied;
generate a keyed hash of a data line based on a statistical counter value and a memory address to which to write the data line, wherein the statistical counter value is incremented in response to the determination;
store the keyed hash to a cache line, wherein the cache line includes a plurality of keyed hashes and each of the keyed hashes corresponds with a different data line; and
encrypt the data line based on the keyed hash, the memory address, and the statistical counter value.

2. The computing device of claim 1, wherein to encrypt the data line comprises to encrypt the data line based on a counter mode encryption algorithm.

3. The computing device of claim 1, wherein to encrypt the data line comprises to encrypt the data line using fewer than ten rounds of symmetric-key encryption algorithm operations.

4. The computing device of claim 3, wherein to encrypt the data line comprises to encrypt the data line using exactly two rounds of the symmetric-key encryption algorithm operations.

5. The computing device of claim 1, wherein to generate the keyed hash comprises to generate a keyed hash message authentication code (HMAC).

6. The computing device of claim 1, wherein the memory address comprises a physical memory address.

7. The computing device of claim 1, wherein the plurality of instructions, when executed by the one or more processors, further cause the device to retrieve the statistical counter value from the cache line.

8. The computing device of claim 1, wherein the plurality of instructions, when executed by the one or more processors, further cause the device to regenerate the keyed hash based on a new statistical counter value in response to a determination that the statistical counter value has changed.

9. The computing device of claim 8, wherein the plurality of instructions, when executed by the one or more processors, further cause the device to re-encrypt the data line in response to a determination that the statistical counter value has changed.

10. The computing device of claim 1, wherein the statistical counter value incorporates a version of the data line.

11. One or more non-transitory, machine-readable storage media comprising a plurality of instructions stored thereon that, in response to execution by a computing device, causes the computing device to:
   determine, at each cache write operation in a memory device associated with the computing device, that a reference probability is satisfied;
   generate a keyed hash of a data line based on a statistical counter value and a memory address to which to write the data line, wherein the statistical counter value is incremented in response to the determination;
   store the keyed hash to a cache line, wherein the cache line includes a plurality of keyed hashes and each of the keyed hashes corresponds with a different data line; and
   encrypt the data line based on the keyed hash, the memory address, and the statistical counter value.

12. The one or more non-transitory, machine-readable storage media of claim 11, wherein to encrypt the data line comprises to encrypt the data line based on a counter mode encryption algorithm.

13. The one or more non-transitory, machine-readable storage media of claim 11, wherein the plurality of instructions further causes the computing device to:
   regenerate the keyed hash based on a new statistical counter value in response to a determination that the statistical counter value has changed; and
   re-encrypt the data line in response to a determination that the statistical counter value has changed.

14. A computing device for memory decryption, the computing device comprising:
   one or more processors;
   one or more memory devices having stored therein a plurality of instructions that, when executed by the one or more processors, cause the computing device to:
   decrypt an encrypted data line based on a keyed hash, a statistical counter value, and a memory address from which the encrypted data line is accessed;
   determine, at each cache write operation in the one or more memory devices, that a reference probability is satisfied;
   generate a keyed hash of the decrypted data line based on the memory address and statistical counter value, wherein the statistical counter value is incremented in response to the determination;
   retrieve another keyed hash corresponding with the data line from a cache line, wherein the cache line includes a plurality of keyed hashes and each of the keyed hashes corresponds with a different data line; and
   compare the generated keyed hash to the another keyed hash retrieved from the cache line to verify an integrity of the data line.

15. The computing device of claim 14, wherein to decrypt the encrypted data line comprises to decrypt the encrypted data line based on a counter mode encryption algorithm.

16. The computing device of claim 14, wherein to decrypt the encrypted data line comprises to decrypt the encrypted data line using fewer than ten rounds of symmetric-key encryption algorithm operations.

17. The computing device of claim 16, wherein to decrypt the encrypted data line comprises to decrypt the encrypted data line using exactly two rounds of the symmetric-key encryption algorithm operations.

18. The computing device of claim 14, wherein to generate the keyed hash comprises to generate a keyed hash message authentication code (HMAC).

19. The computing device of claim 14, wherein the memory address comprises a physical memory address.

20. The computing device of claim 14, wherein the plurality of instructions, when executed by the one or more processors, further cause the device to retrieve the statistical counter value from the cache line.

21. The computing device of claim 14, wherein the plurality of instructions, when executed by the one or more processors, further cause the computing device to alert an administrator of the computing device in response to a determination that the generated keyed hash does not match the another keyed hash.

22. The computing device of claim 14, wherein the statistical counter value incorporates a version of the data line.

23. One or more non-transitory, machine-readable storage media comprising a plurality of instructions stored thereon that, in response to execution by a computing device, cause the computing device to:
   determine, at each cache write operation in one or more memory devices associated with the computing device, that a reference probability is satisfied;
   decrypt an encrypted data line based on a keyed hash, a statistical counter value, and a memory address from which the encrypted data line is accessed, wherein the statistical counter value is incremented in response to the determination;
   generate a keyed hash of the decrypted data line based on the memory address and statistical counter value;
   retrieve another keyed hash corresponding with the data line from a cache line, wherein the cache line includes a plurality of keyed hashes and each of the keyed hashes corresponds with a different data line; and
   verify an integrity of the data line by comparing the generated keyed hash to the another keyed hash retrieved from the cache line.

24. The one or more non-transitory, machine-readable storage media of claim 23, wherein to decrypt the encrypted data line comprises to decrypt the encrypted data line based on a counter mode encryption algorithm.

25. The one or more non-transitory, machine-readable storage media of claim 23, wherein to decrypt the encrypted data line comprises to decrypt the encrypted data line using fewer than ten rounds of symmetric-key encryption algorithm operations.

26. A method for memory encryption, the method comprising: determining, at each cache write operation in a memory device associated with a computing device, that a reference probability is satisfied;
   generating a keyed hash of a data line based on a statistical counter value and a memory address to which to write the data line, wherein the statistical counter value is incremented in response to the determination;
   storing the keyed hash to a cache line, wherein the cache line includes a plurality of keyed hashes and each of the keyed hashes corresponds with a different data line; and
   encrypting the data line based on the keyed hash, the memory address, and the statistical counter value.

27. The method of claim 26, wherein encrypting the data line comprises encrypting the data line based on a counter mode encryption algorithm.

28. The method of claim 26, wherein the method further comprising
regenerating the keyed hash based on a new statistical counter value in response to a determination that the statistical counter value has changed; and
re-encrypting the data line in response to a determination that the statistical counter value has changed.

29. A method for memory decryption, the method comprising:
determining, at each cache write operation in one or more memory devices associated with a computing device, that a reference probability is satisfied;
decrypting an encrypted data line based on a keyed hash, a statistical counter value, and a memory address from which the encrypted data line is accessed, wherein the statistical counter value is incremented in response to the determination;
generating a keyed hash of the decrypted data line based on the memory address and statistical counter value;
retrieving another keyed hash corresponding with the data line from a cache line, wherein the cache line includes a plurality of keyed hashes and each of the keyed hashes corresponds with a different data line; and
verify an integrity of the data line by comparing the generated keyed hash to the another keyed hash retrieved from the cache line.

30. The method of claim 29, wherein decrypting the encrypted data line comprises decrypting the encrypted data line based on a counter mode encryption algorithm.

31. The method of claim 29, wherein decrypting the encrypted data line comprises decrypting the encrypted data line using fewer than ten rounds of symmetric-key encryption algorithm operations.

* * * * *